United States Patent [19]
Hartmanns et al.

[11] Patent Number: 5,399,418
[45] Date of Patent: Mar. 21, 1995

[54] MULTI-PLY TEXTILE FABRIC ESPECIALLY FOR PROTECTION SUITS AND THE LIKE

[75] Inventors: Joerg Hartmanns, Oldenburg; Detlef Mueller-Wiesner, Harpstedt; Lutz Kampmann, Bremen; Hans-Guenther Reimerdes, Ganderkesee; Wolfgang Fischer, Fischerhude, all of Germany

[73] Assignee: ERNO Raumfahrttechnik GmbH, Bremen, Germany

[21] Appl. No.: 156,000

[22] Filed: Nov. 22, 1993

Related U.S. Application Data

[63] Continuation-in-part of Ser. No. 993,129, Dec. 18, 1992, abandoned.

[30] Foreign Application Priority Data

Dec. 21, 1991 [DE] Germany .......... 41 42 538.3

[51] Int. Cl.6 .................................... B32B 7/02
[52] U.S. Cl. ................. 428/218; 2/243.1; 2/2.11; 2/904; 139/420 R; 139/426 R; 139/DIG. 1; 428/224; 428/225; 428/246; 428/247; 428/257; 428/263; 428/266; 428/253; 428/421; 428/422; 428/446; 428/212; 428/911
[58] Field of Search ............ 428/253, 224, 225, 212, 428/218, 246, 247, 257, 263, 266, 421, 422, 119, 116, 105, 446, 109, 911; 139/DIG. 1, 420 R, 426 R; 2/243 A

[56] References Cited

U.S. PATENT DOCUMENTS

| | | | |
|---|---|---|---|
| 4,923,741 | 5/1990 | Kosmo et al. | 428/252 |
| 5,014,755 | 5/1991 | Bompard et al. | 428/109 |
| 5,100,713 | 3/1992 | Homma et al. | 428/102 |
| 5,137,058 | 8/1992 | Anahara et al. | 139/384 R |
| 5,151,316 | 9/1992 | Durkin et al. | 428/225 |
| 5,198,280 | 3/1993 | Harpell et al. | 428/911 |

Primary Examiner—James J. Bell
Attorney, Agent, or Firm—W. G. Fasse; W. F. Fasse

[57] ABSTRACT

A multi-ply three-dimensionally bonded textile fabric is provided, to be used especially in making protective space suits, protective space shielding and other protective garments or shields. The fabric is a three-dimensionally woven, knitted, netted, braided or otherwise interlocked structure of threads including organic fibers such as aramid, polyethylene and/or polytetrafluoroethylene fibers and preferably also metallic fibers such as copper, aluminum and/or stainless steel fibers. These fibers are chosen to provide protection against adverse thermal, chemical, electrical and mechanical environmental effects that may be hazardous to an astronaut, for example. The fibers are arranged substantially in respective plies, and each ply is bonded or interlocked only to respective adjacent plies over substantially the entire ply area to provide a flexible multi-ply fabric. The threads are arranged to provide a gradient or variation in characteristics or properties from an outer surface to an inner surface. For example, different types, numbers or densities of threads, or different fabric densities may be used in different plies to achieve a gradient. Such a gradient allows a single, three-dimensionally bonded multi-ply fabric to provide several different protective properties. An outside surface coating of silicone or polymers such as polytetrafluroethylene or ethylene-tetrafluoroethylene may be applied on an outer surface of the fabric to further improve its protective properties.

26 Claims, 6 Drawing Sheets

MULTI-PLY TEXTILE FABRIC ESPECIALLY FOR PROTECTION SUITS AND THE LIKE

CROSS-REFERENCE TO RELATED APPLICATION

This application is a Continuation-In-Part application of our commonly assigned application U.S. Ser. No. 07/993,129, filed on Dec. 18, 1992, now abandoned, the entirety of which is incorporated herein by reference.

FIELD OF THE INVENTION

The invention relates to a textile fabric comprising a plurality of interconnected plies for protection purposes, such as for use in space suits, fire protection suits, and the like. The fabric is also suitable for forming shielding for protecting structures in outer space. The fabric is made of synthetic fibers and has good flexibility so that it may be folded or draped or used to make comfortable protective clothing.

BACKGROUND INFORMATION

When astronauts are to perform extra vehicular activities (EVA) outside of a spacecraft, they require protective space suits for protecting them against the direct influences and conditions prevailing in outer space. These influences and conditions in outer space include, for example, the potentially very great dangers that could be caused by impact of micrometeorites or other space "garbage" radioactive radiation, particle radiation, or atomic oxygen, as well as attack by aggressive chemical substances. Such aggressive substances may, for example, stem from the remainder or decomposition components of rocket fuel used by the position control rockets of a spacecraft, for example. Additionally, a protective space suit must provide sufficient thermal protection against the wide range of temperatures prevailing in outer space. Further, the fabric for making such space suits must be especially resistant to gas permeation. Thus, the fabric must be especially resistant to friction and mechanical wear and tear as well as electrical static charges and discharges. Such static electrical charging and discharging must be prevented because these phenomena may cause microscopically small holes in the space suit. Furthermore, the fabric or material used in such space suits must be extremely resistant to all types of electromagnetic radiation and any possible degrading influence caused by chemicals that may contact the suit during EVA in space, or that may be used for cleaning and/or for decontaminating such suits.

It is also very important that protective fabric used in a space suit, or as a protective shielding in space is sufficiently flexible that it may be folded and draped, e.g. to use as a shielding material, and that it forms a comfortable space suit. If the fabric is too stiff, or becomes stiff when subjected to outer space conditions, then a suit or other protective clothing will be uncomfortable and clumsy and will not allow the effective and efficient performance of EVA. Furthermore, a more flexible fabric is easier to handle during its manufacture, storage, distribution, etc., when manufacturing protective clothing therefrom or when shaping protective shielding from the fabric.

A textile fabric to be used in fire protection suits or other protective clothing such as fire or chemical protection gloves, jackets, or headgear, must meet many of the same requirements described above regarding protective space suits. For example, fabric used to make fire protective clothing must be flexible and comfortable, must provide good thermal insulation and must resist degrading effects of aggressive chemicals and mechanical wear and abrasion.

U.S. Pat. No. 4,923,741 discloses a laminar structure for use as a protective covering such as a protective space suit. Such a laminar structure comprises an outer layer known commercially as ORTHOFABRIC, including a surface layer of woven, expanded tetrafluoroethylene fibers known under the Tradename GORE-TEX. Below the surface layer, the ORTHOFABRIC includes a layer of meta- or para-aramide fibers (polyparaphenyleneterephthalamide) known under the Tradenames NOMEX or KEVLAR. The outer GORETEX layer is intended to protect against atomic oxygen and against abrasions while the lower layer shall provide for the mechanical strength and resistance against mechanical wear and tear. The disclosed fabric also contains electrically conductive fibers to provide for electrostatic charge dispersion and a discharge path for static or other electrical charges. Additionally, the known fabric is provided with a coating of silicone or Teflon-FEP (Tetrafluoroethylene-Fluoroethylene-Propylene). The Teflon-FEP coating shall protect against chemical influences of spacecraft fuel remainders.

In addition to the ORTHOFABRIC layer, the disclosed laminar structure includes middle layers of thermal insulation, a protective layer against short wave electromagnetic radiation as well as an inner layer for protecting the wearer against abrasion as well as against mechanical damage, including protection against the above mentioned impacts of micrometeorites.

OBJECTS OF THE INVENTION

In view of the foregoing it is the aim of the invention to achieve the following objects singly or in combination:

- to construct a multi-ply textile fabric so as to reduce the high manufacturing costs of conventional multi-layered fabrics described above and to provide a lighter, thinner and more flexible fabric than the conventional multi-layered material;
- to provide a multi-ply textile fabric suitable for use by itself or as an outer protection layer over other inner layers of a protective space suit or space shielding, or other protective clothing, while still providing the astronaut or other wearer with the required mobility as well as the required protection against micrometeorite impact, radiation, unsurvivable temperatures, chemical degradation, electrical charging, mechanical wear and abrasion, etc.;
- to provide a multi-ply textile fabric in which each ply of the multi-ply structure is three-dimensionally bonded to adjacent plies to provide a three-dimensional fabric structure as opposed to a single-ply fabric or a loose, unbonded multi-layered fabric;
- to provide a multi-ply textile fabric in which each ply is three-dimensionally bonded only to the immediately adjacent plies to provide a more flexible three-dimensionally bonded fabric;
- to provide a multi-ply textile fabric in which each ply is three-dimensionally bonded to adjacent plies substantially over the entire surface of a ply; and
- to provide a multi-ply textile fabric in which the plies are interconnected to form a three-dimensionally bonded fabric and the respective plies have different fiber densities, fabric densities sities and/or different fiber materials to form a gradient of characteristics through the multi-ply bonded fabric from an outer ply to an inner ply.

SUMMARY OF THE INVENTION

The above objects have been achieved by a multi-ply textile fabric according to the invention, wherein the warp and weft fibers extending substantially in a respective plane form a respective ply, which is interconnected with immediately adjacent plies by means of tying or bonding fibers, so as to form a three-dimensionally bonded fabric. Within the three-dimensionally bonded fabric, a gradient may be established from an outer surface to an inner surface of the fabric. For example, the gradient may represent a change in the fiber type, fiber density, fabric density, etc.

The fabric according to the invention has the advantage that it is relatively lightweight and especially that it is flexible compared to conventional fabrics of a multilayer or protective type. This is because the fabric according to the invention forms a three-dimensionally bonded fabric, with each ply bonded only to adjacent plies across the surface of the ply rather than a sandwich fabric of independent layers stitched together along their edges or a stiff fabric of many plies all stitched together. Thus, the fabric according to the invention provides a protective fabric for a space suit giving an astronaut the required mobility without appreciably impairing the protection characteristics of the fabric. The present fabric is flexible and comfortable enough to provide the required protection throughout an entire space mission. Additionally, the present fabric may be used on earth for activities requiring protection and flexibility, for example, for protective suits used in decontamination or fire fighting activities.

Another advantage is that the three-dimensional bond of the fibers itself provides improved strength and protection against micrometeorite impact. Thus, the fabric according to the invention may provide sufficient impact protection even without an additional further inwardly located special layer provided particularly for impact protection.

Yet another advantage of the present fabric is that a multi-purpose protection effect is achieved with a single fabric, because it integrates different types of fibers, each having specific protective characteristics, in a three-dimensionally bonded fabric. By arranging the fibers in accordance with a gradient that changes from the outer surface to the inner surface of the fabric, it is possible to incorporate particular fibers having different characteristics or functions into different plies of the fabric to achieve specific purposes with a single fabric rather than providing distinct specialized fabric layers. Thus, different types of fibers may be used in different plies or the density of the fibers themselves or the density of the fabric structure may vary in accordance with the desired characteristics from the outside surface inwardly for optimally adapting the fabric characteristics to the respective requirements. For example, the density may increase from the outside inwardly or vice versa by locating fibers of respective densities in the particular plies or by appropriately tightening or loosening the fabric structure of respective plies.

The detailed description below discloses several different specific types of fibers and different ways of providing the three-dimensional interconnection or bonding so as to represent many different possibilities for producing the present fabric depending on the requirements of the intended application.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
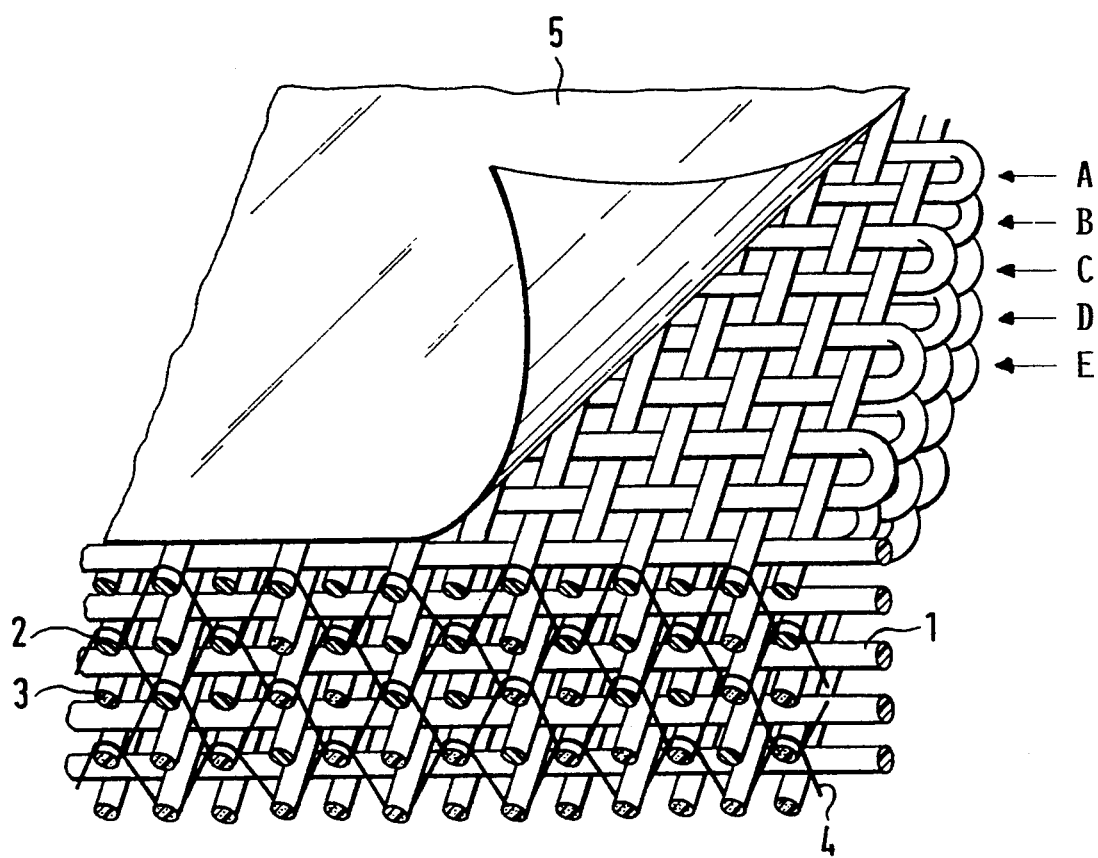
FIG. 1 is a perspective schematic view of a three-dimensionally bonded woven fabric according to the invention.

FIG. 1 shows an example embodiment of a three-dimensionally structured woven fabric according to the invention. By "three-dimensionally structured" or "three-dimensionally bonded" is meant a fabric that has a plurality of plies A, B, C, D and E interconnected three-dimensionally to form a single three-dimensionally bonded fabric. A ply may comprise threads or fibers that extend substantially in a plane with one another, for example, the warp and weft threads of ply A.

The weft threads 1, for example, run across the fabric, i.e. from left to right or from right to left, while the warp threads 2 and 3 run perpendicularly to the weft threads. A further group of threads 4 form bonding threads that run three-dimensionally out of the planes of the individual plies to bind or bond adjacent plies to one another. The outwardly facing surface of the present fabric, i.e. the outer surface of ply A, faces upwardly in FIG. 1 and is covered with a coating 5 to be described in more detail below. Similarly, the nature of the threads or fibers 1, 2, 3, and 4 will also be described in more detail below.

The warp threads or fibers 2 and 3 are made of different materials, as represented by threads 2 being shown with left-slanted cross-hatching and threads 3 being shown with right-slanted cross-hatching. As shown in FIG. 1 the relative proportion of the different thread types, i.e. threads 2 and threads 3, in the entire textile fabric changes uniformly in the thickness direction. More specifically, the proportion of threads 3 increases from ply A to ply E while the proportion of threads 2 decreases from ply A to ply E.

The threads 2 are made, for example, of polyethylene, known under the Tradename DYNEEMA. These polyethylene threads are arranged predominantly in the outer plies of the three-dimensionally structured fabric. The weft threads 1 are preferably also made of polyethylene. Such polyethylene threads have a high modulus of elasticity and combine a low density with a high mechanical strength, so that the proportion of these threads in the outer plies of the fabric provides the primary protection against micrometeorite impact. Additionally, these threads provide excellent mechanical characteristics, such as toughness against ripping, strength against fatigue phenomena, and a resistance to abrasive wear and tear. Additionally, polyethylene threads have a good resistance to ultraviolet radiation.

The second proportion of warp threads, namely the threads 3, are arranged predominantly in the plies toward the inner surface of the three-dimensional fabric. These threads are made, for example, of aramid fibers commercially known under the Tradename NOMEX. Among their many advantageous characteristics, these aramid fiber threads have a relatively good thermal resistance. Different types of aramid fibers may be used instead of or in addition to the NOMEX fibers. For example, fibers known under the Tradename KEVLAR or TWARON may also be used in threads 3. In addition to good thermal resistance, all of these fibers have a good resistance to chemically aggressive media.

By providing a gradient in the proportion of warp threads 2 or warp threads 3 provided in successive plies of the fabric, desired characteristics of the fabric are achieved. For example, the high proportion of DYNEEMA polyethylene threads in the outer plies of the fabric shown in FIG. 1, and especially the 100% content of DYNEEMA in the outermost ply A, provides excellent resistance to mechanical abrasion or ripping, as well as micrometeorite impact resistance at the outer surface of the fabric. The increasing proportion of aramid fibers, such as NOMEX fibers, in successive plies toward the inner ply E gives the fabric good resistance to thermal effects and protection against chemical agents. Due to the gradient of thread or fiber type, the single three-dimensionally bonded multi-ply fabric can provide several advantageous characteristics. This gradient is possible, for example, because the inner plies do not need as much mechanical strength against abrasion and wear, so they may contain higher proportions of fibers or threads with other special characteristics.

The three-dimensional fabric according to the invention may be provided with an external coating 5 in order to further increase the present fabric's resistance against adverse chemical influences, as well as against thermal and mechanical loads, while simultaneously providing protection against electromagnetic radiation, and preventing electrical charging while discharging static charges. The coating 5 is made, for example, of a copolymer known as ETFE comprising fifty percent by volume of ethylene and fifty percent by volume of tetrafluoroethylene. Alternatively, the coating 5 may be a silicone coating or some other protective barrier. The coating 5 is preferably applied as a thin film which contains a proportion of a metal oxide, for example, within the range of 0.1 to 2.0% by weight. The metal oxide provides an improved protection against absorption and emission, as well as against electrical charging effects. The metal oxides in the coating film 5 preferably include $TiO_2$ and/or $BaSO_4$.

Preferably, the threads 4, which provide the inter-ply bonding, or the threads 1, 2, or 3 are also made of or include a metallic material, such as copper, stainless steel or aluminum, for further improving the fabric's electrical protective properties, among others. The metallic threads may, for example, be single metallic filaments, spun yarns, multi-filament yarns or combinations of metallic filament with synthetic filaments, in the form of a metallic coating on synthetic threads, a metallic filament spun in with a synthetic filament, etc.

The fabric of the invention may be produced by different methods and with different three-dimensional interlocking structures. FIG. 1 shows five substantially planar woven plies bonded together by an out-of-plane bonding thread 4. Preferably, a three-dimensional weave is used so that adjacent plies are interwoven with each other without using a separate bonding thread 4. Thereby, a so-called interlock structure is produced in which each ply is interwoven with one or two adjacent plies. This can be achieved, in effect, by introducing the bonding threads 4 into the several plies of FIG. 1.

Figure 2:
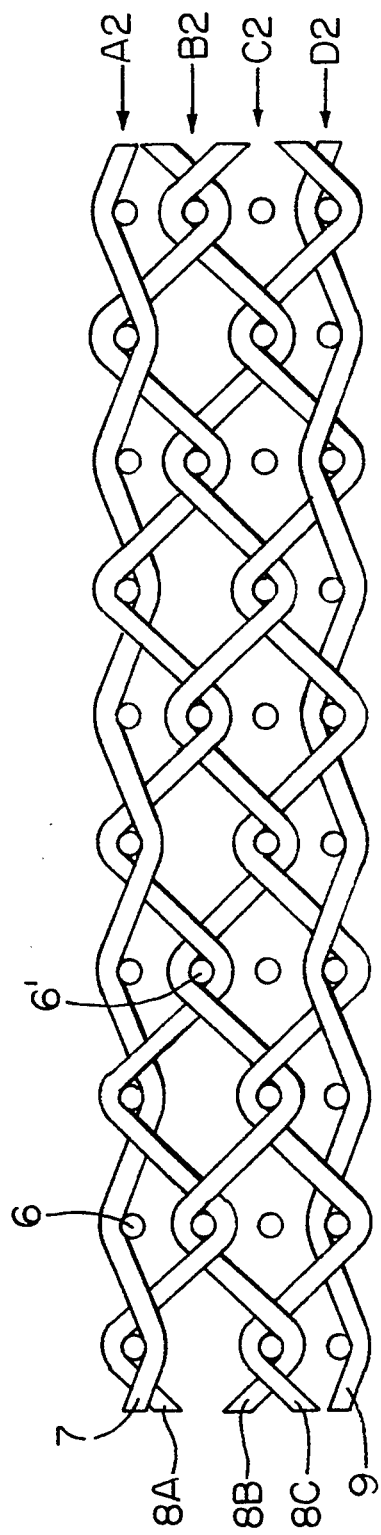
FIG. 2 is a sectional view of another three-dimensionally bonded woven fabric according to the invention.

FIG. 2 is a sectional view similar to the end view seen in the perspective of FIG. 1, but showing another embodiment of the fabric of the invention, using a three-dimensional interlocking weave. The fabric of FIG. 2 has four interlocked plies A2, B2, C2 and D2 defined by four layers of warp threads 6. The warp threads 6 may include different materials defining a gradient as described above for warp threads 2 and 3 with reference to FIG. 1. In addition, or alternatively, as shown in FIG. 2, the warp threads 6 may be arranged with a different weave density in different plies to form a density gradient. Thus, threads 6' in ply B2 are arranged with a lower fabric weave density than are threads 6 in plies A2, C2 and D2. As a result, ply B has half the warp thread density of the other plies A2, C2 and D2. Alternatively, it is possible to arrange the warp threads uniformly to provide a uniform weave density but to use threads having different inherent densities if desired to provide a density gradient. Such a density gradient allows a lighter, more flexible fabric to be produced, which still provides the desired protective characteristics.

The outermost ply A2 is further defined by weft thread 7. The thread 7 may, for example, be a polytetrafluoroethylene ("PTFE") thread. The PTFE threads 7 form an outer protective ply, because they are very resistant to temperature and chemical effects, and they provide good electrical insulation and a low-friction outer surface that is resistant to abrasion.

The adjacent plies are respectively interlocked by threads 8. As shown in FIG. 2, ply A2 is interlocked with ply B2 by thread 8A, ply B2 is interlocked with ply C2 by thread 8B and ply C2 is interlocked with ply D2 by thread 8C. All three threads 8A, 8B and 8C may be aramid fiber blend threads or yarns, for example, a 20% NOMEX "Delta A"/ 80% KEVLAR 29 multi-filament yarn. These threads 8 provide an effective three-dimensional interlocking of adjacent plies across the entire area of the ply, as well as providing the characteristic properties of the aramid materials described above. The interlocking or bonding of only adjacent plies, rather than all plies, provides more flexibility in the finished fabric. Interlocking or bonding over the entire area of a ply, rather than along edges or defined stitch lines, provides more uniform flexibility and less bulkiness in the fabric.

The innermost ply D2 includes weft thread 9, which may be a DYNEEMA fiber thread to provide the properties of mechanical strength, impact resistance and ultraviolet resistance described above.

Figure 3:
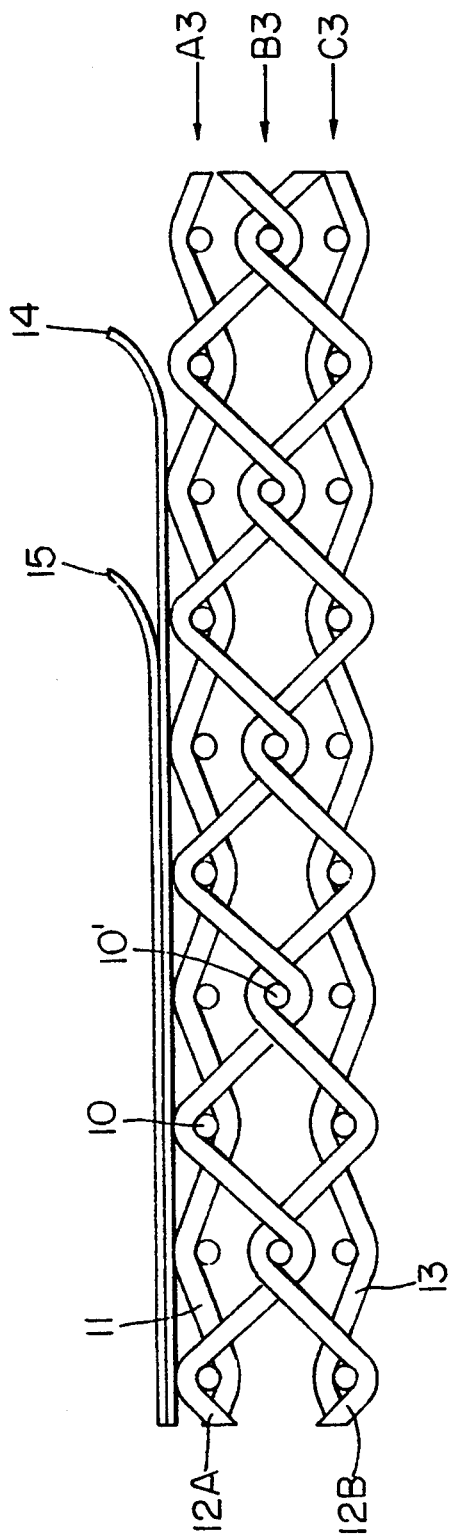
FIG. 3 is a sectional view of another woven fabric according to the invention, with protective coating layers applied on an outer surface thereof.

FIG. 3 shows another three-dimensionally woven fabric, having three plies A3, B3 and C3 defined by three planes of warp threads 10. Warp threads 10' of ply B3 are arranged to provide half the weave density of plies A3 and C3 and thus provide a density gradient as described above. Interlocking weft thread 12A bonds plies A3 and B3 together, while interlocking weft thread 12B bonds plies B3 and C3 together.

Weft thread 11 of surface ply A3 and weft thread 13 of inner ply C3 may, for example, each be a KEVLAR multi-filament thread. Interlocking weft threads 12A and 12B may each be a NOMEX/KEVLAR blend multi-filament thread.

In order to provide the multi-ply fabric with additional resistance to chemical degradation and electrical charging effects, a surface coating may be applied according to the invention. As shown in FIG. 3, a first coating layer 14 is applied as a 25 $\mu$m thin film of fluorinated ethylene propylene (FEP) on the outer ply A3. A second coating layer 15 may be applied over the first layer 14 as a 25 $\mu$m thin film of FEP with about 1% by weight of a metal oxide such as titanium dioxide. The advantages of such a thin film coating and of the coating's content of metal oxide are discussed above with reference to coating 5 of FIG. 1.

Figure 4:
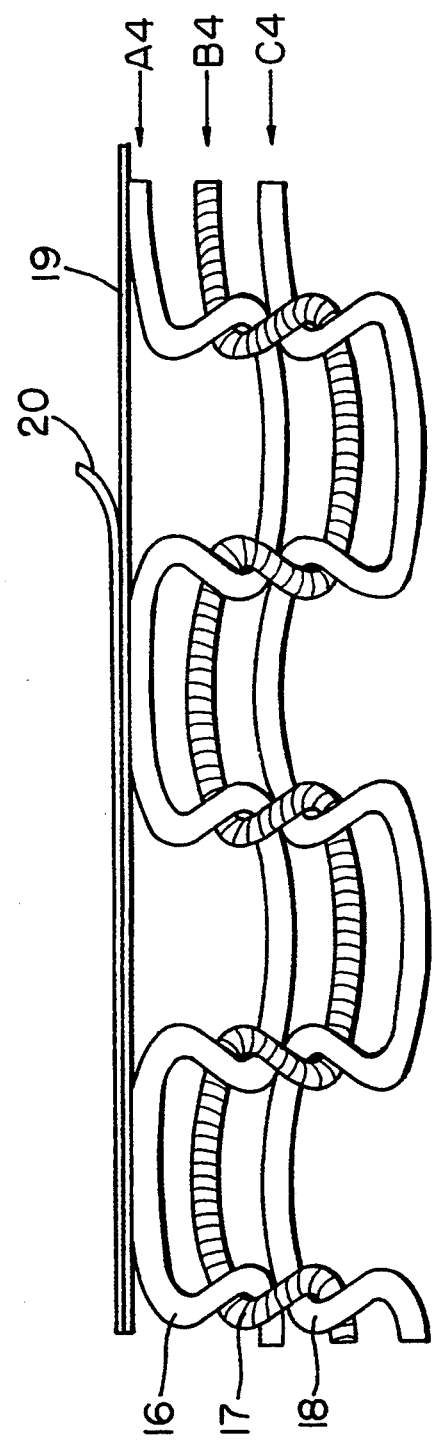
FIG. 4 is a sectional view of a three-dimensionally bonded knitted fabric according to the invention with protective coating layers applied on an outer surface thereof.

FIGS. 1 to 3 show a three-dimensionally bonded multi-ply fabric according to the invention produced by weaving techniques and thus having woven threads making up and interlocking the plies. However, other methods may be used to form these three-dimensionally structured fabrics of the invention, for example, by braiding, netting, knitting, or stitching. To provide a fabric according to the invention, however, these methods must make it possible to use different types of threads or fibers throughout the three-dimensional textile structure and to bond these different threads or fibers to each other so that the type of fiber and/or the density is changed from an outer surface to an inner surface of the fabric, for example, by varying the number of threads per surface area in each ply or per volume within the body of the fabric. In this manner the above mentioned gradient is achieved while simultaneously fixing the individual fibers or threads in the three-dimensional bond of the fabric. For example, FIG. 4 shows a three-dimensionally bonded fabric according to the invention, produced by knitting methods. The knitted fabric of FIG. 4 includes three plies A4, B4 and C4 in effect, each defined by a knitting yarn or thread 16, 17 and 18 respectively. The outer surface thread 16 and inner surface thread 18 may each be a KEVLAR 29 multi-filament yarn, while the central thread 17 may be a hybrid yarn of NOMEX "Delta A" spun yarn and KEVLAR 29 multi-filament yarn. These different thread materials arranged in a gradient across the thickness of the fabric, i.e. from an outer layer to an inner layer, provide the respective advantageous properties discussed above.

Each thread is knitted together with its adjacent threads to form a three-dimensionally bonded or interlocked knitted fabric. Thus, thread 16 is interlocked with thread 17 to bond together ply A4 with ply B4. Similarly, thread 17 is interlocked with thread 18 to bond together ply B4 with ply C4. This achieves very good flexibility of the fabric while maintaining its mechanical strength, micrometeorite impact resistance, and other protective properties.

Alternatively, this fabric can be considered to have two plies A4 and C4, respectively defined by threads 16 and 18, and bonded together by a bonding thread 17. Because of the three-dimensional bonding of the fabric, individual plies are not identifiable as distinct and separate plies, but rather each ply is overlapped with or bonded to adjacent plies.

A protective coating layer is applied to the outer surface ply A4. A first protective coating layer 19 is a 25 $\mu$m thin film of FEP, corresponding essentially to coating layer 14 shown in FIG. 3 and discussed above. A second or outer coating layer 20 is a 25 $\mu$m thin film of FEP including about 1% by weight of titanium dioxide, corresponding essentially to coating layer 15 shown in FIG. 3 and discussed above.

Figure 5:
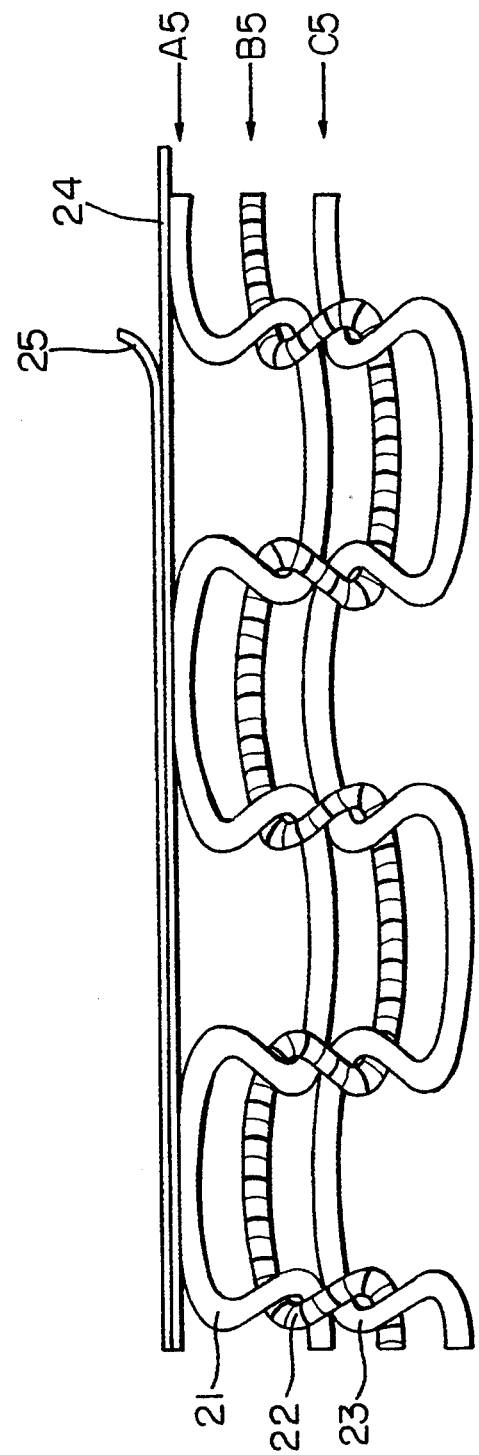
FIG. 5 is a sectional view of another knitted fabric according to the invention.

FIG. 5 shows another knitted fabric according to the invention. It is generally similar to the fabric of FIG. 4, except for the substitution of a thread material for thread 22. Thus, plies A5, B5 and C5, threads 21 and 23 and layers 24 and 25 correspond respectively to plies A4, B4 and C4, threads 16 and 18, and layers 19 and 20 of FIG. 4.

Thread 22 of FIG. 5, however, is a hybrid yarn made of NOMEX "Delta A" spun yarn, KEVLAR 29 multi-filament yarn and copper wires having a diameter of about 0.1 mm and running in the weft direction. The advantageous properties of the NOMEX and KEVLAR materials are described above, and the copper filaments wound into the thread improve the fabric's electrical protective properties among others, as also described above.

Further, the present fabric may have any desired number of plies, and hence any desired thickness without the interruption of the thread courses or the three-dimensional bonding within the fabric. Semipermeable films for the cover coating may, for example, comprise polyolefin or polyester films known as GORTEX or SYMPATEX respectively, or other films adapted to providing particular protection requirements. By combining a selected coating film to provide a desired surface protection, with selected types of threads to provide desired mechanical, thermal, electrical and/or chemical resistive properties, and by providing a desired number of fabric plies, the present fabric is easily adapted, according to the invention, to be used in many different protective applications. Several such applications are described above. Furthermore, the present fabric may be used by itself to make protective clothing or shielding, or may be used as an outer protective layer over additional insulation layers or other special fabrics.

Figure 6:
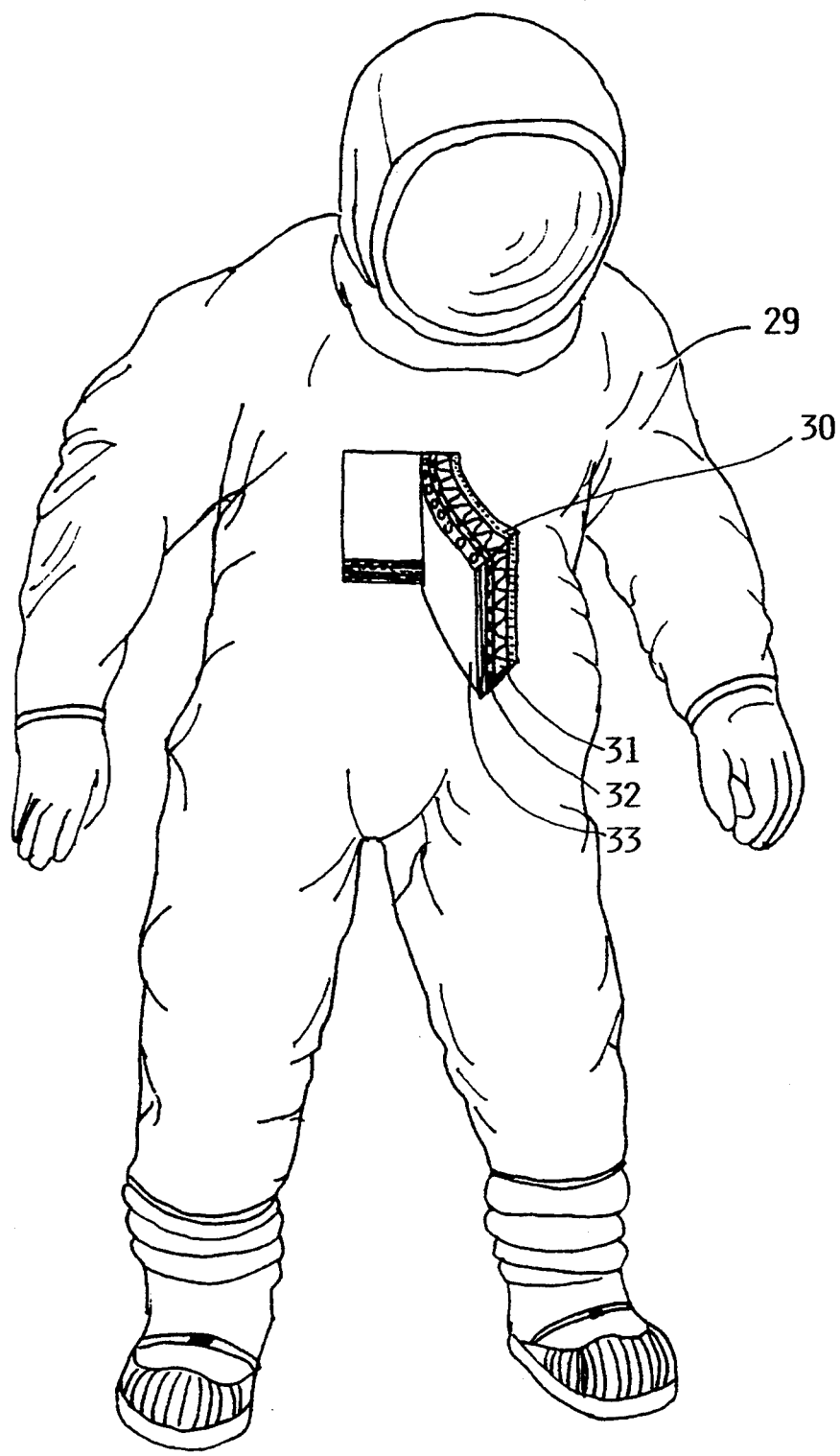
FIG. 6 is a perspective schematic view of a space suit showing a cut-away section of the combination of fabric according to the invention.

FIG. 6 shows the multi-ply textile fabric of the invention in combination with other layers to form a space suit 29. Therein, the multi-ply textile fabric is a protective outer layer forming the surface of the suit. As can be seen in the cut-out section through the space suit in FIG. 6, such a suit may, for example, include a protective layer 30, an insulation layer 31, a pressure-retaining layer 32 and a cooling fluid circulation layer 33. The protective layer 30 may be a layer of any embodiment of the multi-ply fabric described above to provide protection against the hazards of space. The insulation layer 31 may include aluminized Mylar film or other known highly effective insulation materials. The pressure-retaining layer 32 may, for example, include a neoprene coated fabric. The layer 33 includes tubes through which a cooling fluid circulates.

A space suit could include additional layers depending on specific mission requirements. On the other hand, the multi-ply textile fabric of the invention as described above, can be used alone without other layers to form a lightweight, flexible and comfortable protection suit for many applications including as protective wear for astronauts while in space craft, space stations, etc., or for earth-based firefighters, chemically exposed workers, etc.

Although the invention has been described with reference to specific example embodiments, it will be appreciated that it is intended to cover all modifications and equivalents within the scope of the appended claims.

What we claim is:

1. A multi-ply textile fabric especially for providing protection or shielding against adverse thermal, electrical, chemical, radiation or mechanical influences, comprising ply threads arranged to form a plurality of plies and comprising bonding threads arranged to interconnect each of the plies only to immediately adjacent ones of the plies, wherein a gradient variation of fabric properties exists across the plurality of plies in a direction from an outer surface of the fabric to an inner surface of the fabric, and wherein the bonding threads interconnecting adjacent ones of the plies comprise an arrangement of threads selected from the group consisting of woven threads, braided threads, knitted threads, netted threads, stitched threads and combinations thereof, whereby the bonding threads are directed three-dimensionally out of planes of the plies to interconnect the plies.

2. The multi-ply textile fabric of claim 1, wherein the bonding threads interconnect each of the plies only to immediately adjacent ones of the plies substantially uniformly over the area of each of the plies.

3. The multi-ply textile fabric of claim 1, wherein the fabric is sufficiently flexible to be folded and draped.

4. The multi-ply textile fabric of claim 1, wherein the gradient variation of fabric properties comprises a gradient of at least one of fabric density, thread density, thread composition, thread diameter or combinations thereof.

5. The multi-ply textile fabric of claim 4, wherein the ply threads comprise threads of at least two different types having different material compositions.

6. The multi-ply textile fabric of claim 1, wherein the ply threads comprise synthetic material.

7. The multi-ply textile fabric of claim 6, wherein the synthetic material is selected from the group consisting of polyethylenes, aramids, polytetrafluoroethylenes and combinations thereof.

8. The multi-ply textile fabric of claim 1, further comprising threads including metallic material.

9. The multi-ply textile fabric of claim 8, wherein the threads including metallic material comprise a metal selected from the group consisting of copper, aluminum, stainless steel and combinations thereof.

10. The multi-ply textile fabric of claim 8, wherein the threads including metallic material form bonding threads.

11. The multi-ply textile fabric of claim 8, wherein the threads including metallic material form ply threads.

12. The multi-ply textile fabric of claim 8, wherein the threads including metallic material comprise metallic filaments and synthetic filaments formed together into the thread.

13. The multi-ply textile fabric of claim 8, wherein the threads including metallic material comprise a metallic coating on synthetic material.

14. The multi-ply textile fabric of claim 1, further comprising an outer coating layer.

15. The multi-ply textile fabric of claim 14, wherein the outer coating layer comprises a polymer.

16. The multi-ply textile fabric of claim 15, wherein the outer coating layer comprises a material selected from the group consisting of silicones, copolymers of ethylene and tetrafluoroethylene, fluorinated ethylene-propylenes, polyesters, polyolefins and combinations thereof.

17. The multi-ply textile fabric of claim 16, wherein the coating layer comprises a copolymer of about 50 volume percent of ethylene and about 50 volume percent of tetrafluoroethylene.

18. The multi-ply textile fabric of claim 16, wherein the coating layer comprises fluorinated ethylene propylene in a thin film of about 25 $\mu$m thickness.

19. The multi-ply textile fabric of claim 14, wherein the outer coating layer is a thin layer selected from the group consisting of a thin film and a thin foil.

20. The multi-ply textile fabric of claim 14, wherein the outer coating layer comprises a proportion of a metal oxide.

21. The multi-ply textile fabric of claim 20, wherein the metal oxide comprises an oxide selected from the group consisting of $TiO_2$, $BaSo_4$ and combinations thereof.

22. The multi-ply textile fabric of claim 20, wherein the proportion of metal oxide in the coating layer is between about 0.1 percent by weight and 2.0 percent by weight.

23. The multi-ply textile fabric of claim 1, wherein the ply threads form a plurality of plies in an arrangement of threads selected from the group consisting of woven threads, braided threads, knitted threads, netted threads and combinations thereof.

24. The multi-ply textile fabric of claim 1, further in combination with a thermal insulation layer arranged inwardly from the inner surface and a pressure retention layer arranged inwardly from the thermal insulation layer.

25. An article of protective clothing comprising the multi-ply textile fabric of claim 1.

26. The article of protective clothing of claim 25, further comprising a thermal insulation layer arranged inwardly from the inner surface.

* * * * *